(12) United States Patent
Murray et al.

(10) Patent No.: US 8,733,604 B2
(45) Date of Patent: May 27, 2014

(54) TRANSLATING ROLLER LOAD ASSIST

(75) Inventors: Frederick G. Murray, Southington, CT (US); Kevin W. Harris, Middlebury, CT (US)

(73) Assignee: Thule Sweden AB, Hillerstorp (SE)

( * ) Notice: Subject to any disclaimer, the term of this patent is extended or adjusted under 35 U.S.C. 154(b) by 860 days.

(21) Appl. No.: 11/835,693

(22) Filed: Aug. 8, 2007

(65) Prior Publication Data

US 2008/0035689 A1  Feb. 14, 2008

Related U.S. Application Data

(60) Provisional application No. 60/821,817, filed on Aug. 8, 2006.

(51) Int. Cl.
*B60R 9/042* (2006.01)
(52) U.S. Cl.
USPC .......................... 224/310; 224/319; 224/554
(58) Field of Classification Search
USPC .......... 224/310, 281, 319, 548, 554; 414/462; 296/26.08
See application file for complete search history.

(56) References Cited

U.S. PATENT DOCUMENTS

| | | | | |
|---|---|---|---|---|
| 2,148,245 A * | 2/1939 | Runkle | ........................ | 414/532 |
| 3,924,764 A * | 12/1975 | Youngblood, Jr. | ........... | 414/462 |
| 4,058,243 A * | 11/1977 | Tappan | ........................ | 224/310 |
| 4,081,095 A * | 3/1978 | Wilburn et al. | ............... | 414/462 |
| 4,087,029 A * | 5/1978 | Shoemaker | ................... | 224/310 |
| 4,531,879 A * | 7/1985 | Horowitz | ...................... | 414/462 |
| 4,830,249 A * | 5/1989 | Mirenda et al. | ............... | 224/310 |
| 4,877,169 A * | 10/1989 | Grim | ............................. | 224/331 |
| 4,953,757 A * | 9/1990 | Stevens et al. | ................ | 224/310 |
| 5,511,928 A * | 4/1996 | Ellis | .............................. | 414/462 |
| 5,624,063 A * | 4/1997 | Ireland | ......................... | 224/324 |
| 5,690,259 A * | 11/1997 | Montani | ....................... | 224/310 |
| 5,904,463 A * | 5/1999 | Christensen | ................. | 414/462 |
| 5,951,231 A * | 9/1999 | Allen | ............................ | 414/462 |
| 5,957,350 A * | 9/1999 | Giles | ............................ | 224/310 |
| 6,164,507 A * | 12/2000 | Dean et al. | ..................... | 224/324 |
| 6,516,984 B1 * | 2/2003 | Kmita et al. | .................. | 224/310 |
| 6,705,822 B2 * | 3/2004 | Oldak | .......................... | 414/532 |
| 6,715,652 B2 * | 4/2004 | Kmita et al. | .................. | 224/314 |
| 8,245,893 B2 * | 8/2012 | Sautter et al. | ................. | 224/310 |
| 2008/0193265 A1 * | 8/2008 | Sautter et al. | ................. | 414/462 |

FOREIGN PATENT DOCUMENTS

| | | | |
|---|---|---|---|
| DE | 3102863 A1 * | 9/1982 | |
| DE | 4010175 A1 * | 10/1991 | |

* cited by examiner

*Primary Examiner* — Nathan J Newhouse
*Assistant Examiner* — John Cogill
(74) *Attorney, Agent, or Firm* — Novak Druce Connolly Bove + Quigg LLP

(57) ABSTRACT

A roller load assisted roof-top carrier for elongate articles such as kayak boats. The roof-top carrier includes a space frame having at least a U-shaped portion, the legs of which are each slidingly mountable to each of a front and back cross bar of a vehicular roof rack. In this manner, the space frame translates unitarily relative to the vehicular roof rack. Forward and back cross members are provided that are mounted upon the space frame, the front cross member carrying a pair of kayak saddles, each faced with a friction inducing material for discouraging slippage between a secured kayak and the space frame and the back cross member carrying a pair of guide panels, each faced with a slip inducing material for encouraging slippage between a kayak being loaded on or unloaded from the space frame. A roller is mounted on a back bight portion of the space frame, the roller being located at a fixed spacing with respect to the front and back cross members.

14 Claims, 9 Drawing Sheets

TRANSLATING ROLLER LOAD ASSIST

CROSS-REFERENCE TO RELATED APPLICATIONS

The present application is based on and claims priority from provisional application 60/821,817 filed Aug. 8, 2006, the entire contents of which are incorporated by reference.

DESCRIPTION

Vehicular roof-top load carriers for elongate articles such as kayaks and ladders are well known. Among other reasons, the location of these types of racks atop the vehicle is advantageous because they provide a relatively unobstructed area where such long items can be carried without unnecessarily extending beyond the bounds of the vehicle below.

Where kayaks are concerned, traditional carrier design has included paired guide (or glide) plates and/or saddles, the former usually substantially vertically oriented and faced with a slide promoting material such as felt and the later usually more horizontal in orientation and faced with a friction promoting material such a neoprene or the like.

During loading, the kayak is initially "threaded" from the back of the vehicle between the guides or glide plates and then slid forward until the bow of the boat is resting on the front saddles with the stern of the boat resting on a roller or other support, between the guides. Heretofore, the front-to-back spacing between the saddles and glide plates has been dependent on the spacing of the cross bars of the underlying rack system as the saddles have been fixedly mounted to the front cross bar while the glide plates have been mounted to the back cross bar of a conventional roof-top rack system. This limited arrangement has several design weakness. The first is that the referenced front to back spacing between the saddles and guides is fixed without regard for the characteristics of the kayak that will actually be loaded and transported on the carrier. Therefore for longer boats the supports may be too close together under the mid-region of the boat to provide adequate stability which can result in a tendency for the boat to "teeter" atop the fulcrum established when the closely spaced cross bars. Such a configuration can be appreciated referring to FIG. 1 and imagining that the back guide plates (top left) and the front saddles (bottom right) are mounted on the longer interior cross bars of the underlying vehicle rack instead of the distally located and shorter cross members of the sliding space-frame which is the subject of the present disclosure.

Referring to FIG. 1, a design solution is depicted in which a translating space-frame is slidingly mounted to the two cross bars of the vehicular rack. The frame itself is basically rectangular in shape and is composed of multiple joined pieces. While depicted as having many tubular sections in FIG. 1, it is considered satisfactory to have a front-half, C-bend and a back-half, C-bend which are releasably joined together (see joint midway between the vehicular cross bars). Among other benefits, the use of a plurality of joined-together sections permits the rack to be shipped very compactly.

The use of roller load assists is not new; they have been known in such arrangements that facilitate roof-top, long-boat loading for some time. A problem, however, has been encountered when a roller such as that shown at the top left hand end of FIG. 1 has been mounted to a single vehicular cross bar. In at least one such known design, the rollers are installed on the bight portion of a U-shaped support member; however, the legs of the "U" were connected to only one vehicle cross bar. During loading, the U-support would be pulled out toward the back of the vehicle, but this increases the lever arm between the roller and the point of attachment to the cross bar with the primary detrimental effect being an unacceptable torquing (twisting) of the supporting cross bar when the weight of the boat was added upon the roller. In order to avoid such high twisting forces, the extension length of such rollers has had to be limited. This also precipitated a problem in which the roller cannot be positioned far enough back to clear the back edge of the vehicle and thereby rendered the conventional roller load assist inadequate under certain circumstances.

The rectangular space frame of FIG. 1 alleviates the drawbacks described above, as well as delivers additional benefits. When assembled, the space frame is substantially rigid and reciprocates forward-and-back in four guides, each mounted to a cross bar of the vehicular rack. With the space frame spanning the two vehicular cross bars, essentially no torquing is induced in either of the bars which is a significant improvement over the previously known designs.

The guides are configured to transition between a constricted, locked configuration and an expanded slide-permitting configuration. In the constricted configuration, the guides are pinched tight around the space frame thereby locking it into place relative to the vehicle. This will be affected in two primary positions; the first being when the roller is moved back, preferably outside the bounds of the vehicle ready to accept a boat bow and assist in the loading process and the second being when the frame is slid forward with the boat loaded thereon for better weight distribution across the vehicular cross bars. In the illustrated embodiment, the pinching action of the guide is induced by a cam lever that when rotated to a closed position causes a tight pinch to be applied to the sliding frame members. In an opposite, loosened configuration of the cam lever, the guide is relaxed and allowed to expand away from the entrapped space frame thereby permitting translational movement of the frame in the guides.

The forward-to-back elongate nature of the space frame permits the location of the saddle and guide bearing cross members to be strategically located adjacent bulkheads of the boat when in the transporting configuration. This is advantageous in that the bulkhead regions of the boat are the most fortified and it is at the saddles and guide plates that securement straps are normally cinched down. Therefore, tightly cinched tie-down straps will be wrapped around the parts of the boat that can best withstand such constriction thereabout.

It is also contemplated that the space frame may not be completely rectangular with two U-shaped halves, but may be composed of just one U-bend; however, the legs of such a U-bend would be anchored across both vehicular cross bars, and not allowed to twist about just one cross bar alone in the extended configuration.

FIG. 5 shows a right-hand perspective view of the fully loaded, ready-for-transport kayak, while

Figure 1:
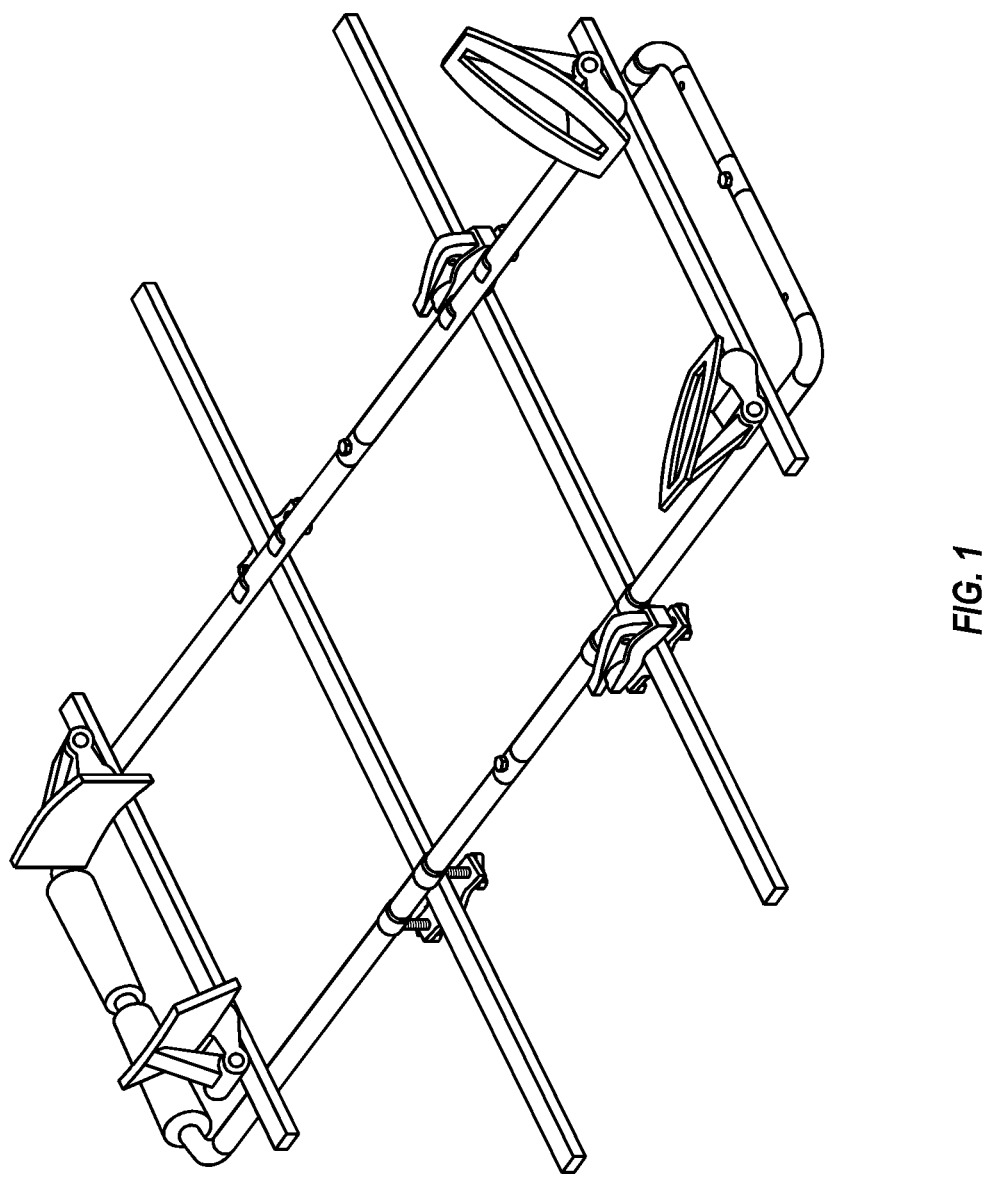
Figure 2:
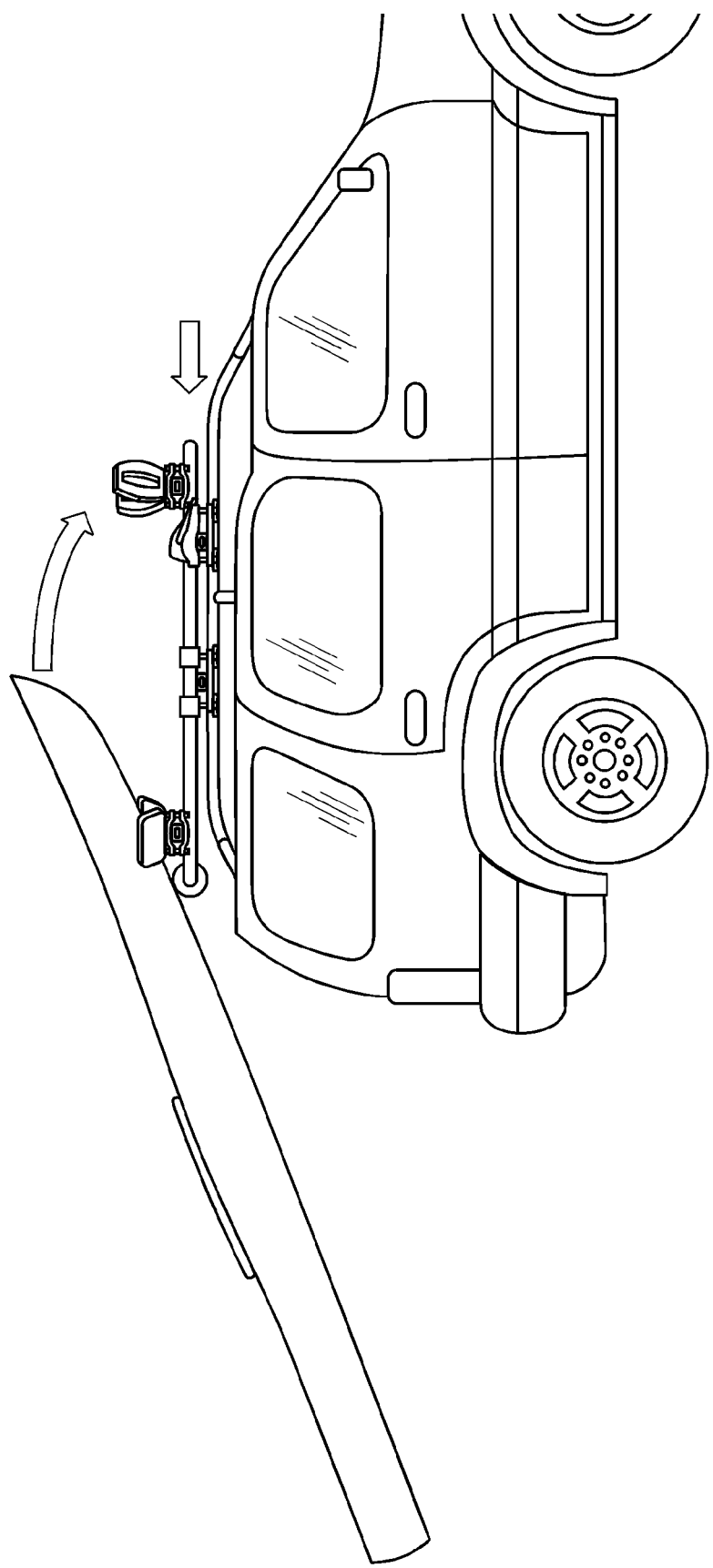
FIG. 2 depicts the roller load assisted roof-top carrier in an extended configuration with the bow of a kayak resting on the roller, positioned between the pair of guide panels.
Figure 3:
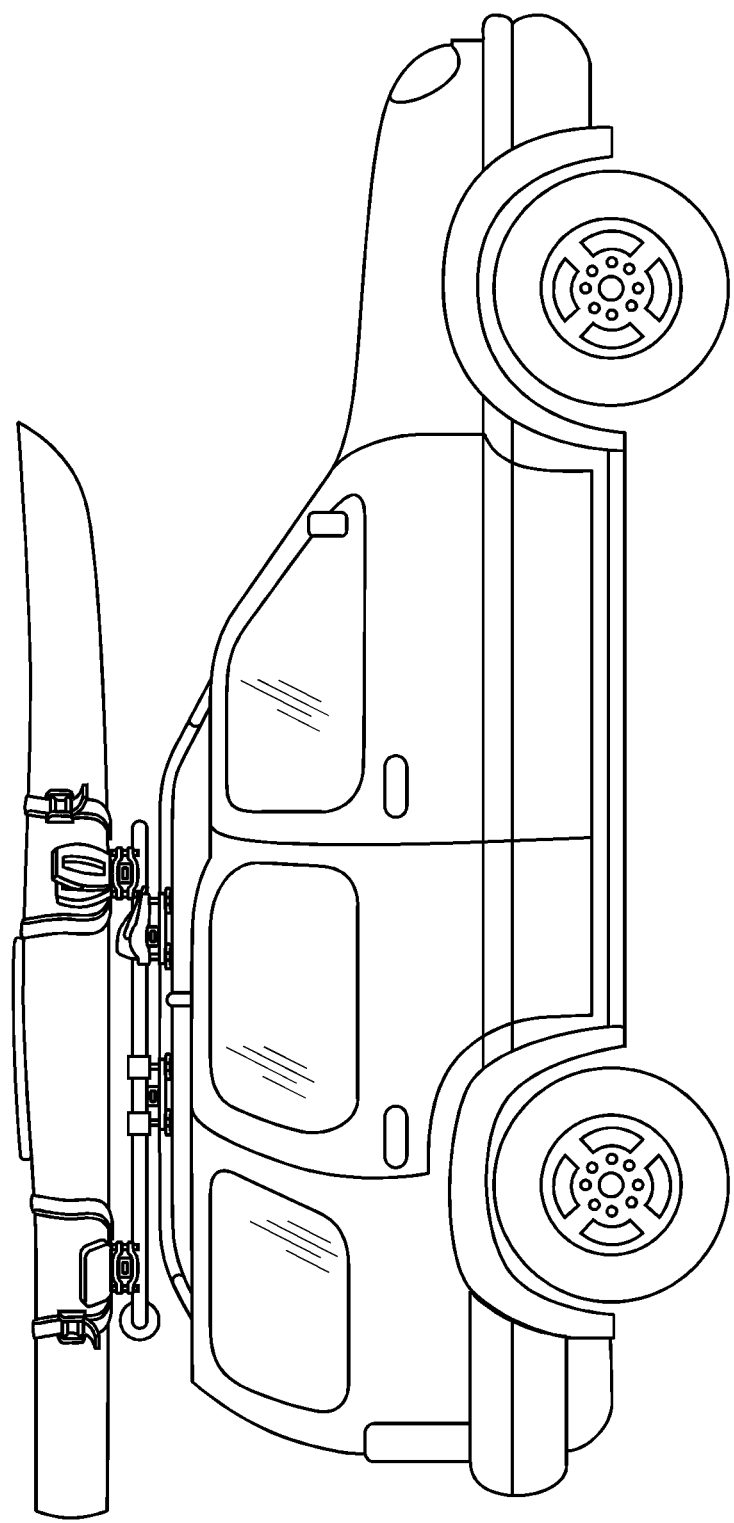
FIG. 3 depicts the carrier with the kayak fully loaded and secured, but still in the extended-back configuration.
Figure 4:
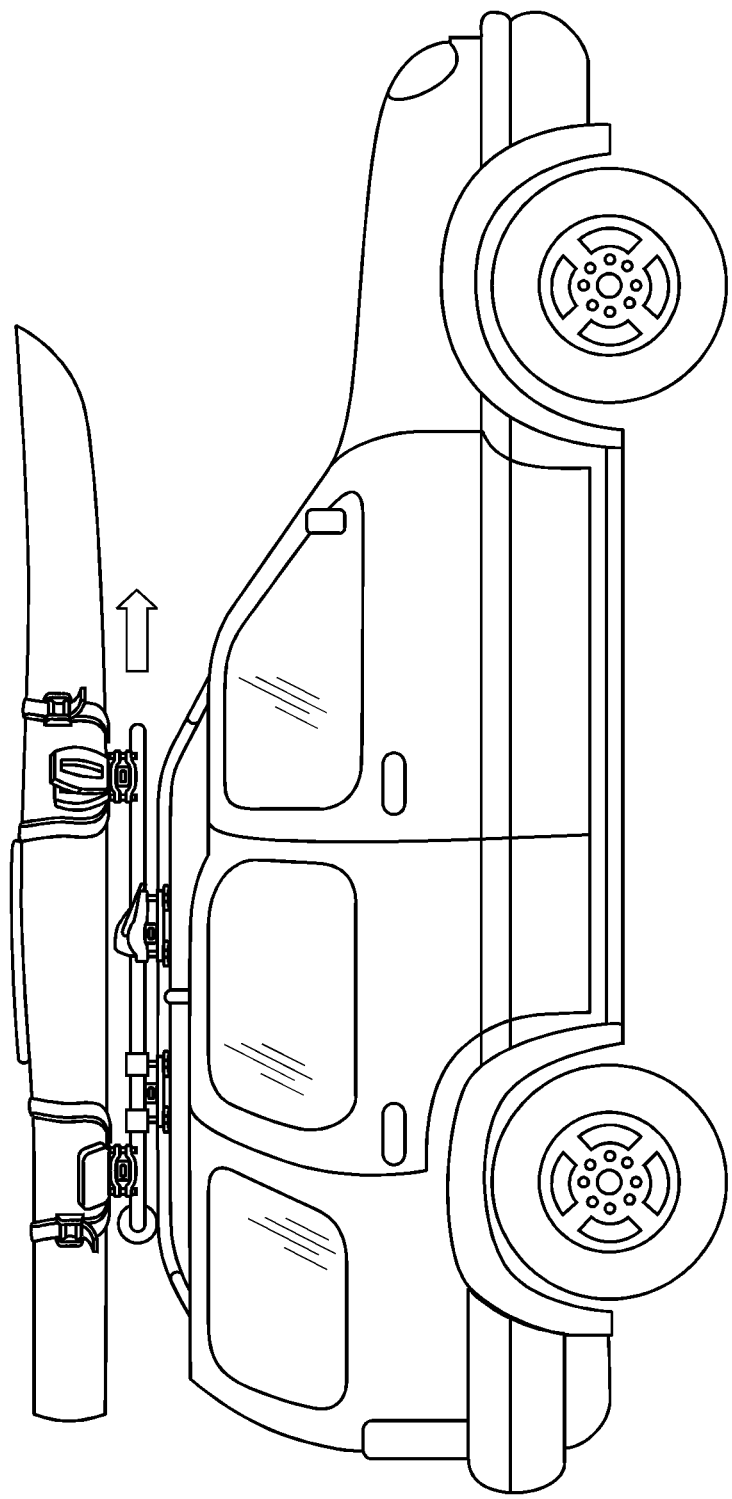
FIG. 4 shows the space frame slid forward into the transport configuration, predominantly balanced between the front and back cross bars of the vehicle rack.
Figure 5:
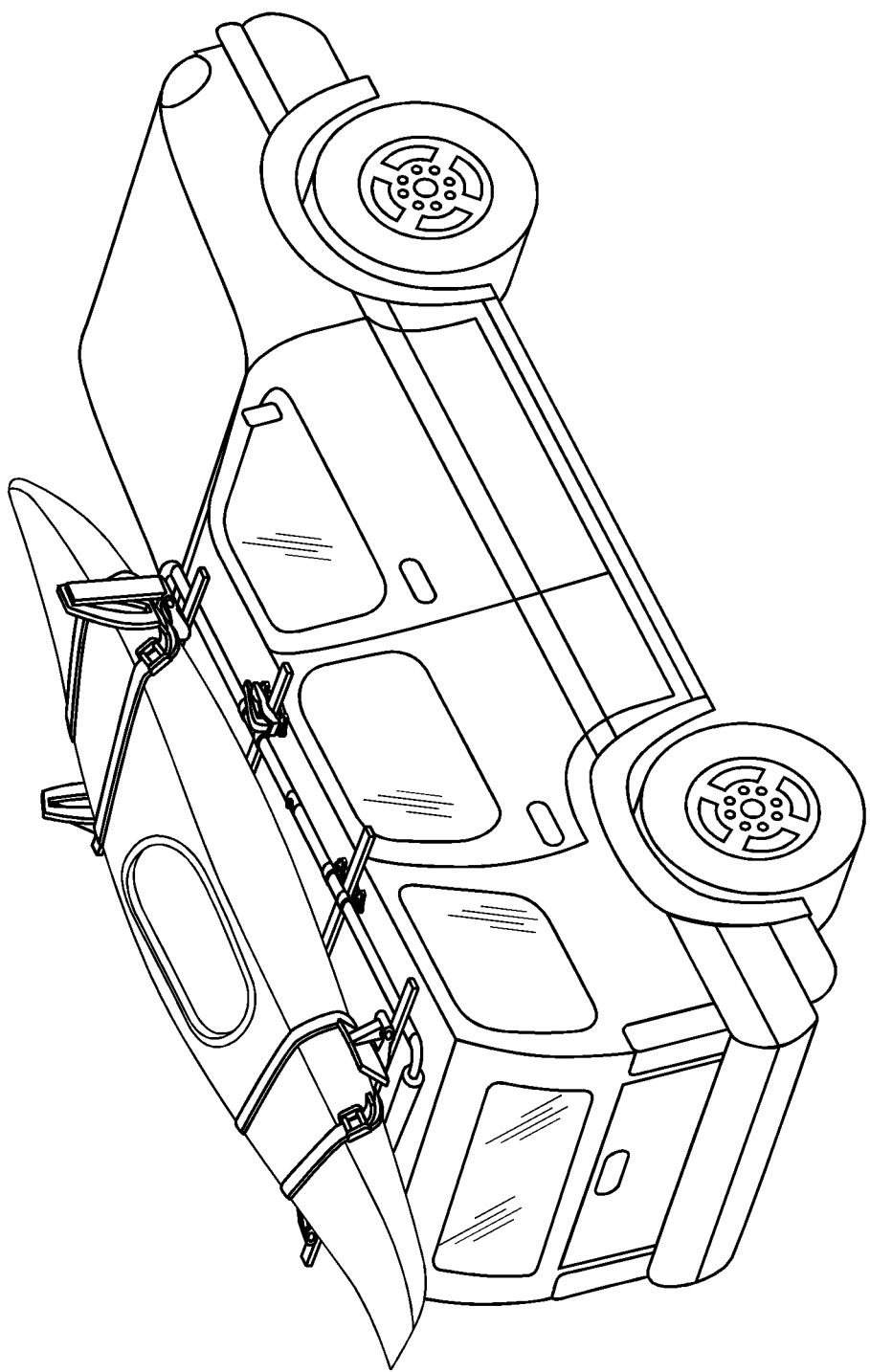
Figure 6:
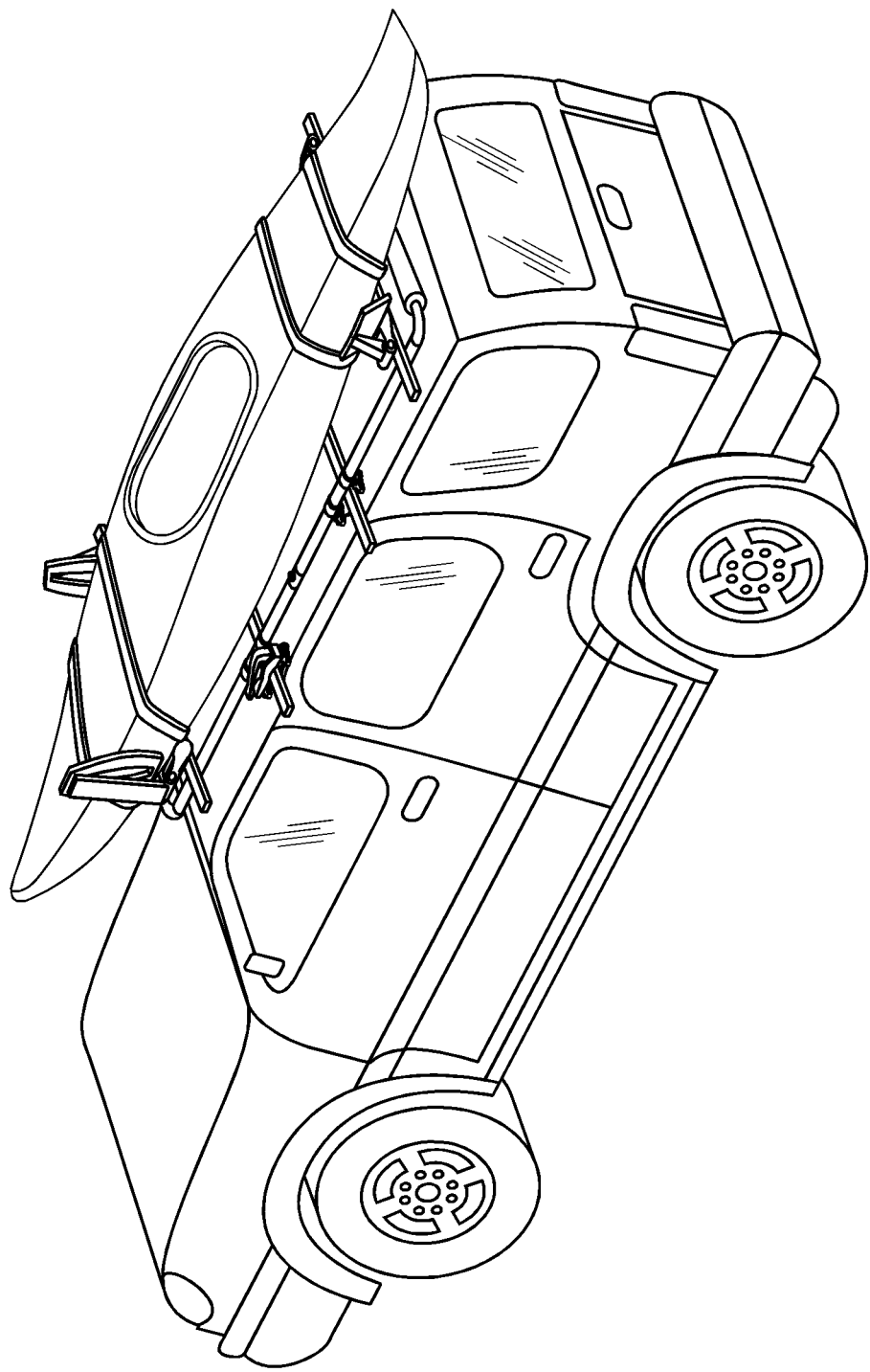
FIG. 6 shows a similar configuration, but from the left hand side.
Figure 7:
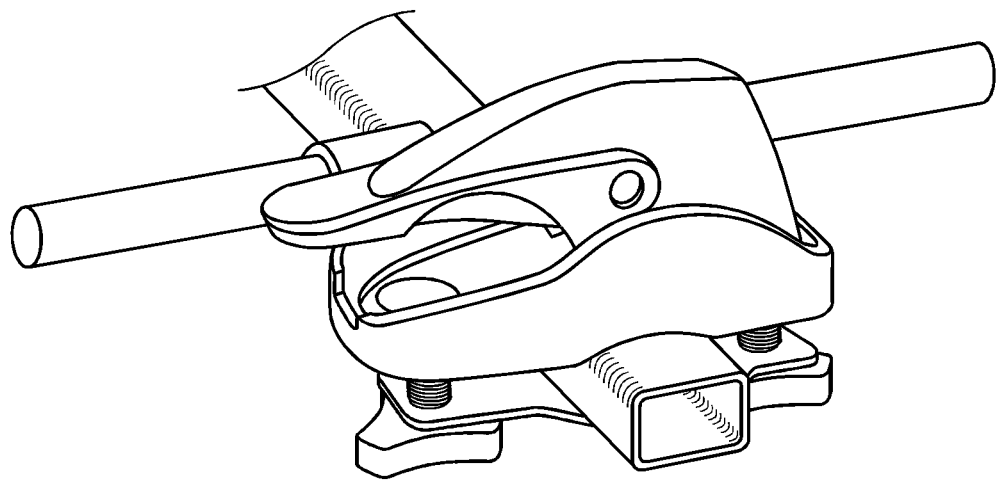

FIG. 7 provides a close-up, detailed view of a levered cam arrangement that expands and contracts about the space frame to permit and deny translational movement of the space frame, respectively.

Figure 8:
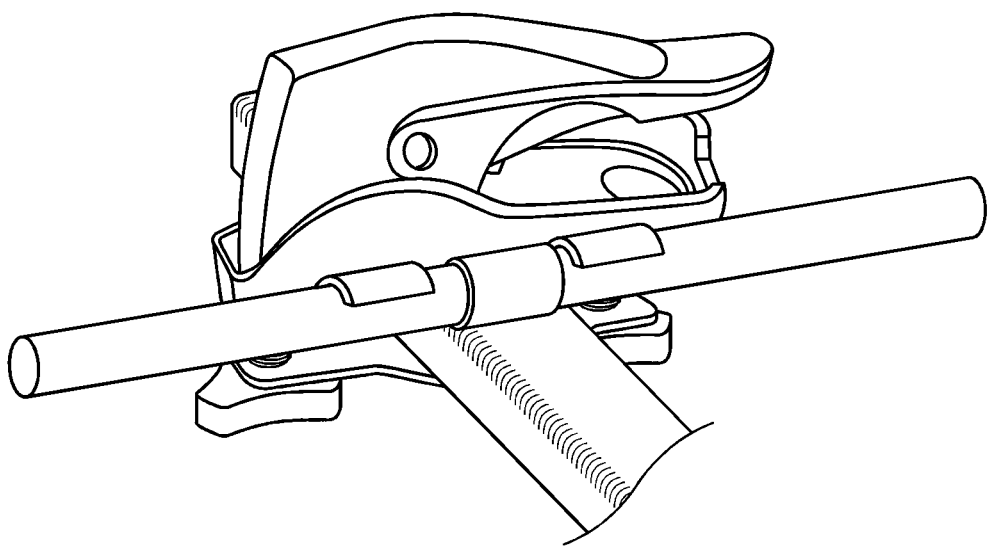

FIG. 8 is an inside view of the levered cam securement arrangement of FIG. 7.

Figure 9:
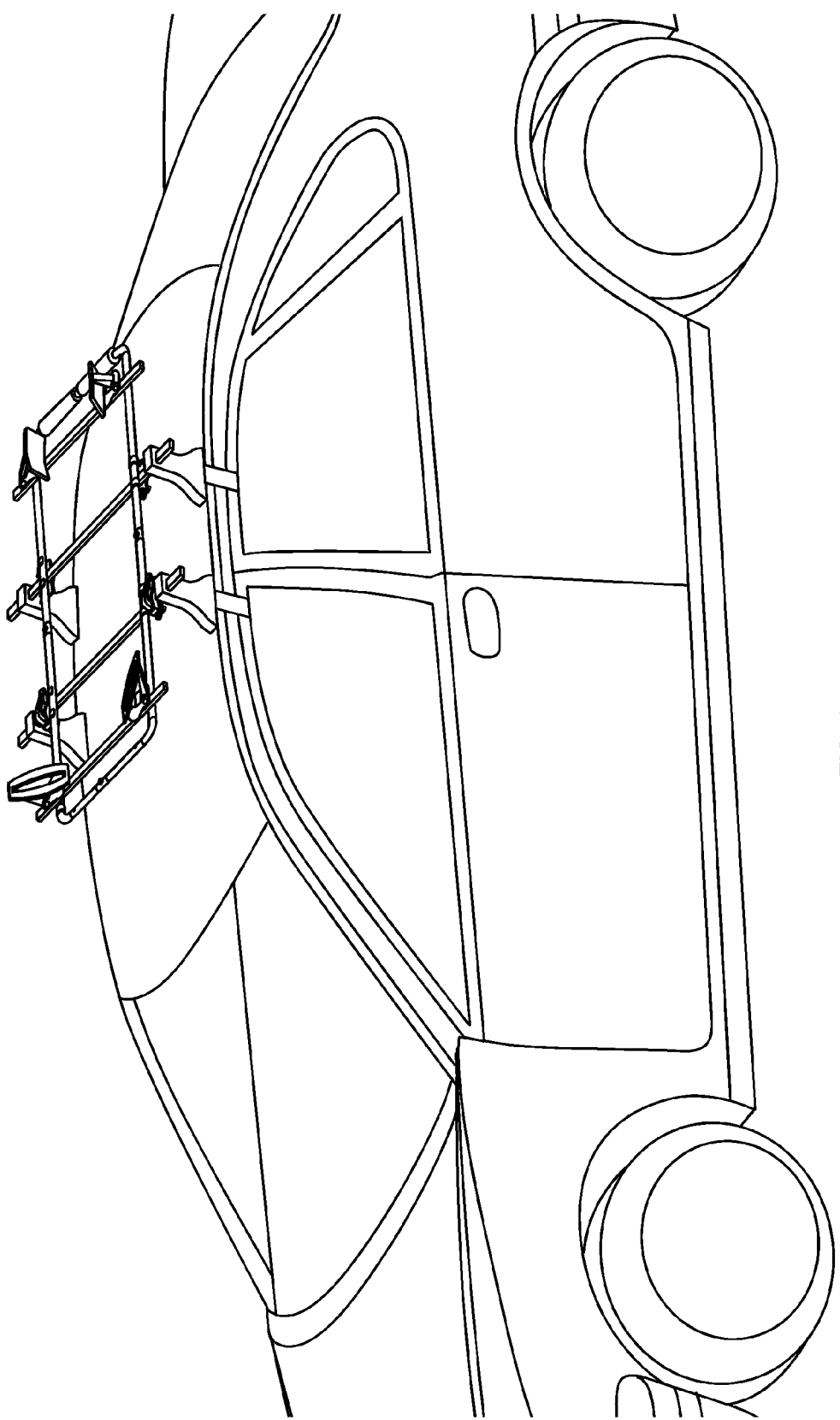
Figure 10:
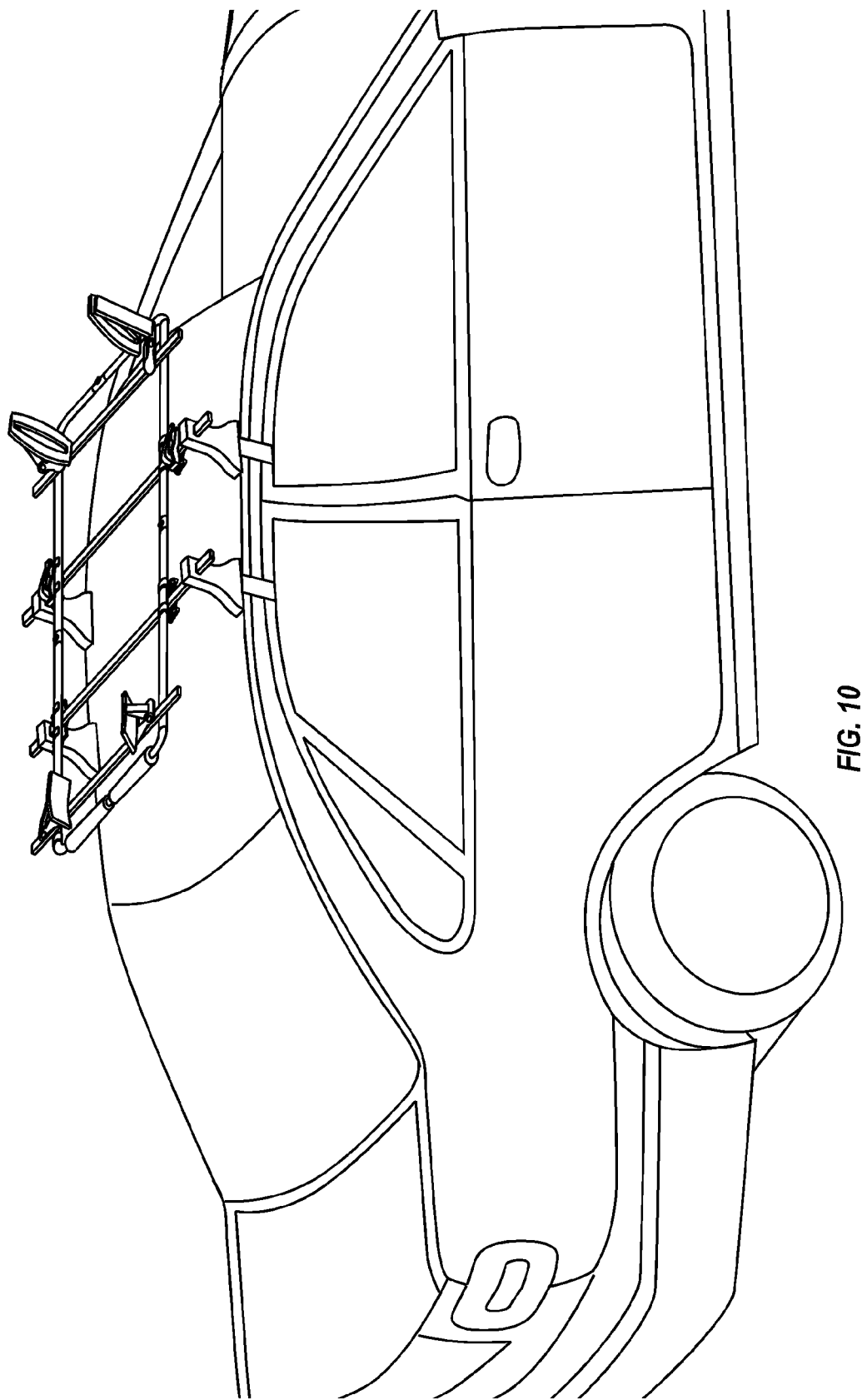

FIGS. 9 and 10 each shows a rack configured according to the presently disclosed teachings, installed atop a car and taken from a front and back perspective, respectively.

The invention claimed is:

1. A vehicular roof-top load carrier for canoes and kayaks comprising:
   a substantially rigid space-frame member having at least a U-shaped portion and at least two legs extending from said U-shaped portion, each leg mountable crosswise to at least two vehicular cross bars and extending along a longitudinal direction of said vehicle with said U-shaped portion extending in a rearward direction of said vehicle and having a canoe or kayak engaging portion;
   guide members mounted to said vehicular cross bars with said legs passing therethrough, each slidably receiving one of said legs of said space-frame member, said guide members being actuable between a locked configuration where said guide members pinch the respective leg received therein, thereby preventing movement of said legs, and a slide permitting configuration where the guide member is expanded away from said respective leg received therein, thereby permitting translational movement of said legs in a rearward or frontward direction relative the vehicle,
   wherein in said slide permitting configuration said legs are translatably movable along said longitudinal direction within said guide members between a first contracted position and a second expanded position, and wherein in said second expanded position said canoe or kayak engaging portion of said U-shaped portion is extended further away from one or more of said guide members than when in said contracted position to engage a canoe or kayak thereon without incidentally contacting the vehicle, and wherein said canoe or kayak engaging portion of said U-shaped portion is closer to one or more of said guide members in said contracted position than in said expanded position; and
   a lever communicating with said guide members enabling actuation between said locked configuration and said slide permitting configuration.

2. A vehicular roof-top load carrier for canoes and kayaks comprising:
   a substantially rigid space-frame member having at least a U-shaped portion and at least two legs extending from said U-shaped portion, each leg mountable crosswise to at least two vehicular cross bars and to be mounted and extending along a longitudinal direction of a vehicle with said U-shaped portion extending in a rearward direction of said vehicle and having a canoe or kayak engaging portion;
   guide members having a receiving portion for slidably receiving each leg of said space-frame member to be mounted to said vehicular cross bars, said guide members having a locked configuration wherein said guide members pinch the respective leg received therein whereby said legs are prevented from movement and a slide permitting configuration wherein translational movement of said legs is permitted,
      wherein when said guide members are mounted to said vehicular cross bars and said space-frame member is received in said guide members, said space-frame member is oriented along the longitudinal direction of the vehicle across said vehicular cross bars and translatably movable in a rearward or frontward direction relative the vehicle within said guide members when said guide members are in said slide permitting configuration,
      said legs are translatably movable along said longitudinal direction within said guide members in a rearward or frontward direction relative the vehicle between a first contracted position and a second expanded position, and
      said canoe or kayak engaging portion of said U-shaped portion is extended further away from one or more of said guide members in said expanded position than when in said contracted position to engage a canoe or kayak thereon without incidentally contacting the vehicle, and wherein said canoe or kayak engaging portion of said U-shaped portion is closer to one or more of said guide members in said contracted position than in said expanded position; and
   a lever communicating with said guide members enabling actuation between said locked configuration and said slide permitting configuration.

3. The roof-top load carrier of claim 2, wherein said guide members comprise a mounting mechanism for adjustably mounting the guide members to the vehicular cross bars 4. The roof-top load carrier of claim 3, wherein the mounting mechanism is configured to removably mount the guide members to the vehicular cross bars.

5. The roof-top load carrier of claim 2, wherein said receiving portion is comprised of a tubular portion which at least partially encircles a portion of said legs and permits translational movement when guide members are in said slide permitting configuration.

6. The roof-top load carrier of claim 2 further comprising one or more rollers joined with said U-shaped portion thereby enabling a canoe or kayak to be rolled thereon and loaded upon said load carrier.

7. The roof-top load carrier of claim 2, wherein each guide member comprises a clamping member configured to mount a respective guide member to said vehicular cross members, when the guide members are mounted to said vehicular cross bars and the substantially rigid space-frame member is mounted to the at least two vehicular cross bars along the longitudinal direction of the vehicle.

8. The roof-top load carrier of claim 2 further comprising saddles located across from one another each positioned proximate one leg of said space-frame member, said saddles adapted for bearing a canoe or kayak load thereon.

9. The roof-top load carrier of claim 2, wherein in said second expanded position, the guide member is relaxed and expands away from the space frame thereby permitting translational movement of the frame there.

10. The vehicular roof-top load carrier of claim 2, wherein the U-shaped portion comprise a portion substantially parallel to said vehicular cross bars.

11. The vehicular roof-top load carrier of claim 2 comprising four guide members, two mounted on each two different vehicular cross bars, each positioned on opposite lateral sides of the cross-bar.

12. A vehicular roof-top load carrier for elongate canoes and kayaks comprising:
   a substantially rigid space-frame member having at least a U-shaped portion and at least two legs extending from said U-shaped portion, each leg crosswise to be mounted to vehicular cross bars along a longitudinal direction of a vehicle with said U-shaped portion extending in a rearward direction of said vehicle and having a canoe or kayak engaging portion;

one or more rollers joined with said U-shaped portion thereby enabling a canoe or kayak to be rolled thereon and loaded upon said load carrier;

at least two guide members each having a receiving portion for slidably receiving each leg of said space-frame member to be mounted to said vehicular cross bars, said guide members having a locked configuration wherein said guide members pinch the respective leg received therein whereby said legs are prevented from translatable moving therein and a slide-permitting configuration wherein translational movement of said legs is permitted, wherein when guide members are mounted to said vehicular cross bars and said space-frame member is received in said guide members, said space-frame member is oriented along the longitudinal direction of the vehicle across said vehicular cross bars and translatably movable within said guide members in a rearward or frontward direction relative the vehicle, and when said guide members are in said slide permitting configuration, said legs are translatably movable within said guide members between a first contracted position and a second expanded position, and said canoe or kayak engaging portion of said U-shaped portion is extended further away from one or more of said guide members in said expanded position than when in said contracted position to engage a canoe or kayak thereon without incidentally contacting the vehicle, and wherein said canoe or kayak engaging portion of said U-shaped portion is closer to one or more of said guide members in said contracted position than in said expanded position; and a lever communicating with said guide members enabling actuation between said locked configuration and said slide permitting configuration.

13. The roof-top load carrier of claim 12, wherein said receiving portion is comprised of a tubular portion which at least partially encircles a portion of said legs and permits translational movement when guide members are in said slide permitting configuration.

14. The roof-top load carrier of claim 12, wherein said each guide member comprises a clamping member configured to mount a respective guide member to said vehicular cross members, when the guide members are mounted to said vehicular cross bars and the substantially rigid space-frame member is mounted to the at least two vehicular cross bars along the longitudinal direction of the vehicle.

* * * * *